(12) United States Patent
Yamada

(10) Patent No.: US 10,901,579 B2
(45) Date of Patent: Jan. 26, 2021

(54) DISPLAY METHOD AND DISPLAY APPARATUS

(71) Applicant: Seiko Epson Corporation, Tokyo (JP)

(72) Inventor: Yusuke Yamada, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/724,870

(22) Filed: Dec. 23, 2019

(65) Prior Publication Data
US 2020/0210033 A1    Jul. 2, 2020

(30) Foreign Application Priority Data

Dec. 26, 2018  (JP) .................................. 2018-242243

(51) Int. Cl.
*G06F 3/0482* (2013.01)
*G06F 3/0483* (2013.01)
(Continued)

(52) U.S. Cl.
CPC .......... *G06F 3/0483* (2013.01); *G06F 3/0482* (2013.01); *G06F 3/04817* (2013.01); *G06F 3/04845* (2013.01)

(58) Field of Classification Search
CPC .................................................. G06F 3/0482
(Continued)

(56) References Cited

U.S. PATENT DOCUMENTS

2006/0150215 A1* 7/2006 Wroblewski .......... G06F 3/0481
725/47
2008/0159708 A1* 7/2008 Kazama ........... H04N 21/44008
386/333
(Continued)

FOREIGN PATENT DOCUMENTS

JP     2012-164292 A    8/2012
JP     2012-178002 A    9/2012
(Continued)

*Primary Examiner* — Daniel Rodriguez
(74) *Attorney, Agent, or Firm* — Harness, Dickey & Pierce, P.L.C.

(57) ABSTRACT

Disclosed is a display method in which an image display unit 2 displays an thumbnail image bundle G in which a plurality of thumbnail images T are arranged in a first direction, the thumbnail image bundle G has a static portion 52 in which the thumbnail images T are arranged at equal intervals in a state where a part of the thumbnail image T is displayed by being overlapped with an adjacent thumbnail image T, and a dynamic portion 50 in which an interval between the thumbnail images T adjacent to each other is arranged wider than an interval between the thumbnail images T in the static portion 52, the method including: enlarging a length of an occupied rectangle D, in which the thumbnail image bundle G is occupied, in a second direction intersecting the first direction according to an enlargement instruction of the thumbnail image bundle G when receiving the enlargement instruction; and moving the thumbnail image T of the dynamic portion 50 to the static portion 52 to reduce the number of thumbnail images T of the dynamic portion 50, and enlarging a length in the first direction and a length in the second direction of the plurality of thumbnail images T at an enlargement ratio of the enlargement instruction when the enlargement ratio increases.

7 Claims, 16 Drawing Sheets

(51) Int. Cl.
*G06F 3/0484* (2013.01)
*G06F 3/0481* (2013.01)

(58) Field of Classification Search
USPC .......................................................... 715/764
See application file for complete search history.

(56) References Cited

U.S. PATENT DOCUMENTS

| | | | | | |
|---|---|---|---|---|---|
| 2008/0307343 | A1* | 12/2008 | Robert | ................. | G06F 3/0482 715/765 |
| 2010/0053216 | A1* | 3/2010 | Iwase | ................. | G06F 3/04883 345/634 |
| 2010/0053355 | A1* | 3/2010 | Iwase | ................. | G06F 3/04883 348/222.1 |
| 2010/0095219 | A1* | 4/2010 | Stachowiak | ........ | G06F 16/9562 715/745 |
| 2010/0251167 | A1* | 9/2010 | DeLuca | ................. | G06F 3/0485 715/786 |
| 2012/0185456 | A1* | 7/2012 | Hart | ......................... | G06F 16/16 707/706 |
| 2012/0204099 | A1* | 8/2012 | Yamada | ................. | G06F 3/0483 715/244 |
| 2012/0221943 | A1* | 8/2012 | Yamada | ................. | G06F 9/451 715/243 |
| 2012/0287165 | A1* | 11/2012 | Yamada | ................. | G09G 3/344 345/672 |
| 2013/0002723 | A1* | 1/2013 | Poston | ................. | G06F 3/0482 345/666 |
| 2013/0263055 | A1* | 10/2013 | Victor | ................. | G06F 3/0486 715/835 |
| 2014/0215365 | A1* | 7/2014 | Hiraga | ................. | G06F 3/04883 715/765 |
| 2014/0347296 | A1* | 11/2014 | Yoshikawa | ............. | G06F 3/041 345/173 |
| 2018/0088785 | A1* | 3/2018 | Van Niekerk | ......... | G06F 3/0488 |
| 2018/0146105 | A1 | 5/2018 | Saito | | |
| 2019/0138175 | A1* | 5/2019 | Lucca | ................. | G06F 3/04817 |
| 2019/0313059 | A1* | 10/2019 | Agarawala | .......... | G06F 3/04815 |
| 2020/0034005 | A1* | 1/2020 | Harada | ................. | G06F 3/1446 |
| 2020/0098088 | A1* | 3/2020 | Takano | ..................... | G06T 3/40 |

FOREIGN PATENT DOCUMENTS

JP 2018-084890 A 5/2018
WO WO-2007-091298 A1 8/2007

* cited by examiner

DISPLAY METHOD AND DISPLAY APPARATUS

The present application is based on, and claims priority from, JP Application Serial Number 2018-242243, filed Dec. 26, 2018, the disclosure of which is hereby incorporated by reference herein in its entirety.

BACKGROUND

1. Technical Field

The present disclosure relates to a display method and a display apparatus.

2. Related Art

As technology for displaying a document consisting of a plurality of pages, for example, there is a technology disclosed in JP-A-2012-164292. A display method disclosed in JP-A-2012-164292 displays a thumbnail image bundle consisting of thumbnail images of a plurality of pages, and when a predetermined page is selected from the thumbnail image bundle, the selected predetermined page is enlarged and displayed.

However, the display method described in JP-A-2012-164292 can check the described content of one page that is enlarged and displayed, but cannot check the described content of the plurality of pages of the thumbnail image bundle at the same time.

SUMMARY

A display method according to an aspect of the present disclosure is a display method for displaying a plurality of images on a display unit in which the display unit displays an image bundle in which the plurality of images are arranged in a first direction, the image bundle has a static portion in which the images are arranged at equal intervals in a state where a part of the image is displayed by being overlapped with an adjacent image, and a dynamic portion in which an interval between the images adjacent to each other is arranged wider than an interval between the images in the static portion. The method including: enlarging a length of an occupied rectangle, in which the image bundle is occupied, in a second direction intersecting the first direction according to an enlargement instruction of the image bundle when receiving the enlargement instruction; and moving the image of the dynamic portion to the static portion to reduce the number of images of the dynamic portion, and enlarging a length in the first direction and the length in the second direction of the plurality of images at an enlargement ratio of the enlargement instruction when the enlargement ratio increases.

In the display method described above, the plurality of images may be arranged on a first virtual axis, and displayed by being rotated about each of second virtual axes intersecting the first virtual axis, and further rotated about the first virtual axis.

In the display method described above, the adjacent images arranged in the center of the dynamic portion in the first direction may be in contact with each other or an overlapping ratio of the adjacent images may become smaller when the number of the images in the dynamic portion decreases.

In the display method described above, when the length of the display unit in the first direction is shorter than the length of the display unit in the second direction, the enlargement ratio may be set to a predetermined enlargement ratio.

In the display method described above, the display unit may further display a plurality of the image bundles arranged in the second direction, set a predetermined position in the occupied rectangle of the image bundle for which the enlargement instruction is received as a fixed point, and enlarge the length of each of the occupied rectangles of the plurality of image bundles in the second direction according to the enlargement instruction.

In the display method described above, the predetermined position may be positioned at any position in the occupied rectangle in the second direction.

A display apparatus according to an aspect of the present disclosure includes: a display unit that displays an image bundle consisting of a plurality of images; an image generation unit that generates the plurality of images in which each of the plurality of images arranged on a first virtual axis are rotated around each of second virtual axes intersecting the first virtual axis, and further rotated around the first virtual axis; and a control unit that displays the image bundle having a static portion in which the images are arranged at equal intervals in a state where a part of the image is displayed by being overlapped with an adjacent image, and a dynamic portion in which an interval between the images adjacent to each other is arranged wider than an interval between the images in the static portion, enlarges a length of an occupied rectangle, in which the image bundle is occupied, in a second direction intersecting the first direction along the first virtual axis of the image bundle when receiving the enlargement instruction; and moves the image of the dynamic portion to the static portion to reduce the number of images of the dynamic portion, and enlarges and displays a length in the first direction and the length in the second direction of the plurality of images at an enlargement ratio of the enlargement instruction when the enlargement ratio increases.

DESCRIPTION OF EXEMPLARY EMBODIMENTS

Embodiment

Figure 1:
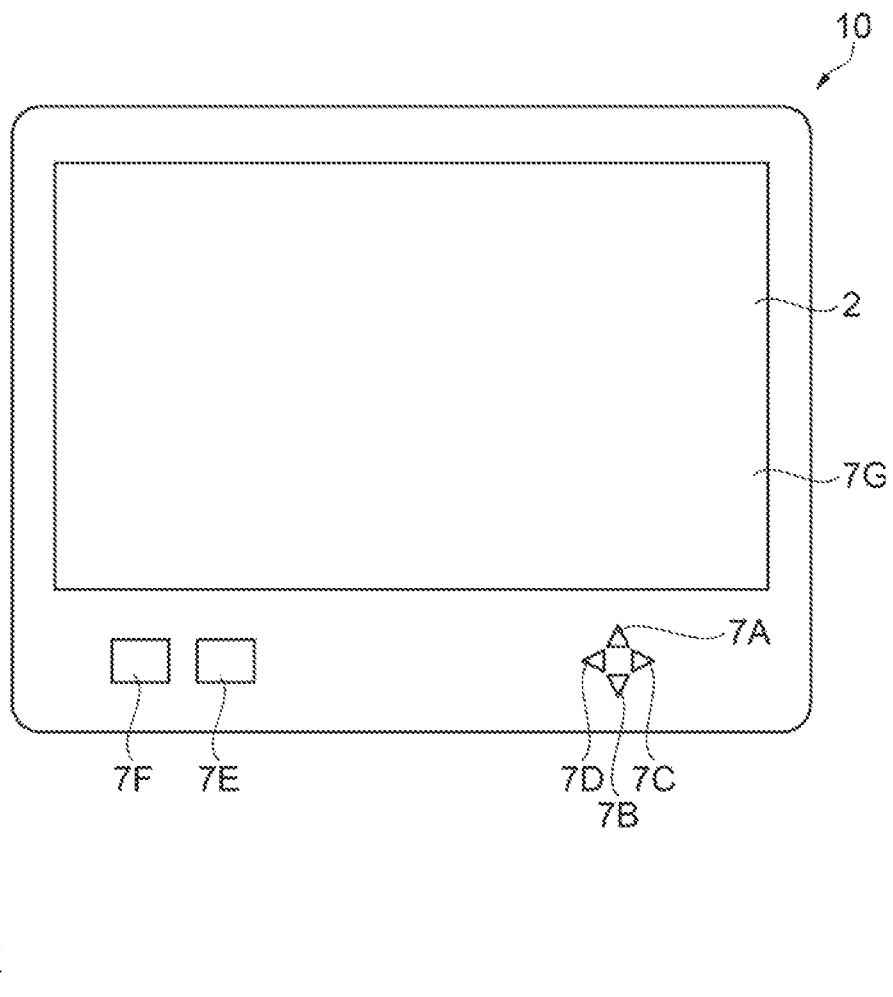
FIG. 1 is a diagram showing an appearance of a viewer according to an embodiment.

Hereinafter, a display method and a display apparatus according to the present embodiment will be described with reference to the drawings. In the present embodiment, an explanation will be given by taking as an example a viewer that can browse and edit an electronic manual, an electronic book, or a document created by a user, which is an example of a document including images, as a display apparatus. In the drawings referred to in the following description, the vertical and horizontal scales of members or portions may be expressed differently from actual ones for convenience of explanation and illustration. In addition, illustrations of components other than those necessary for the explanation may be omitted. In the following, for convenience of explanation, FIGS. 1, 2, 9, 10, 11, 12, 13, and 14 show an X axis, a Y axis, and a Z axis as three axes orthogonal to each other, and a tip side of an arrow indicating each axis is "+", and a proximal side is "−". Further, the direction along the X axis is referred to as a "horizontal direction" as a first direction, the direction along the Y axis is referred to as a "vertical direction" as a second direction, and the direction along a Z axis is referred to as a "depth direction". The description will be made with the −X direction in the horizontal direction as a left or a left side and the +X direction as a right or a right side, and the −Y direction in the vertical direction as a bottom or a bottom side and the +Y direction as a top or a top side. In the present embodiment, the first direction is the horizontal direction and the second direction is the vertical direction. However, the first direction may be the vertical direction and the second direction may be the horizontal direction. That is, the first direction and the second direction only need to intersect each other.

Overview of Viewer

First, an overview of a viewer 10 according to an embodiment will be described with reference to FIGS. 1 and 2.

FIG. 1 is a diagram showing an appearance of a viewer according to the present embodiment, and is a front view of the viewer 10 viewed from an image display unit 2 side as a display unit. FIG. 2 is a diagram showing a thumbnail image bundle G consisting of a plurality of thumbnail images T which is enlarged and displayed on the image display unit 2.

The viewer 10 according to the present embodiment is a display apparatus that displays an image. In this example, the viewer 10 is an apparatus for browsing an electronic book as an example of a document, a so-called electronic book reader. An electronic book is document data including images of a plurality of pages. The viewer 10 displays an electronic book on the image display unit 2 in a certain unit. The certain unit is, for example, one page at a time. Among a plurality of pages included in an electronic book, a page to be displayed is called a selection page. The selection page is changed according to the operation of buttons 7A to 7F or a touch panel 7G shown in FIG. 1 by a user. That is, the user can turn the pages of the electronic book by operating the buttons 7A to 7F or the touch panel 7G. The viewer 10 has a function of executing an application program in addition to browsing electronic books.

The image display unit 2 according to the present embodiment displays a thumbnail image bundle G as an image bundle in which thumbnail images T as a plurality of images obtained by reducing each page of an electronic manual, an electronic book, or a document created by a user are arranged in a horizontal direction. When there is an enlargement instruction for enlarging and displaying the thumbnail image bundle G, the enlarged thumbnail image bundle G is displayed as shown in FIG. 2.

Regarding the thumbnail image bundle G, the thumbnail images T are arranged at equal intervals in a static portion 52, and an interval of the adjacent thumbnail images T in the center of the dynamic portion 50 is arranged wider than an interval between the thumbnail images T in the static portion 52.

The thumbnail image bundle G is arranged at the center of the image display unit 2 in the vertical direction and is arranged along the lower side of the image display unit 2.

The thumbnail image T is an image having a size that occupies a part of the image display unit 2 and is an image obtained by reducing or enlarging the original image. The original image is an electronic manual, an electronic book, or an image of a document data page created by a user. The original image may be an icon of an application program or an operation screen of an application program. An application program and its operation may be assigned to each of the plurality of thumbnail images T.

The viewer 10 includes the buttons 7A to 7F and the touch panel 7G as an input unit 7 on a surface on which the image display unit 2 is disposed. The input unit 7 takes in input from the outside. The input unit 7 receives an operation from a user and processes the operation as an input signal. That is, the user operates the input unit 7 to perform a predetermined input on the viewer 10.

System Configuration of Viewer

Next, the system configuration of the viewer 10 will be described with reference to FIGS. 3 and 4.

Figure 3:
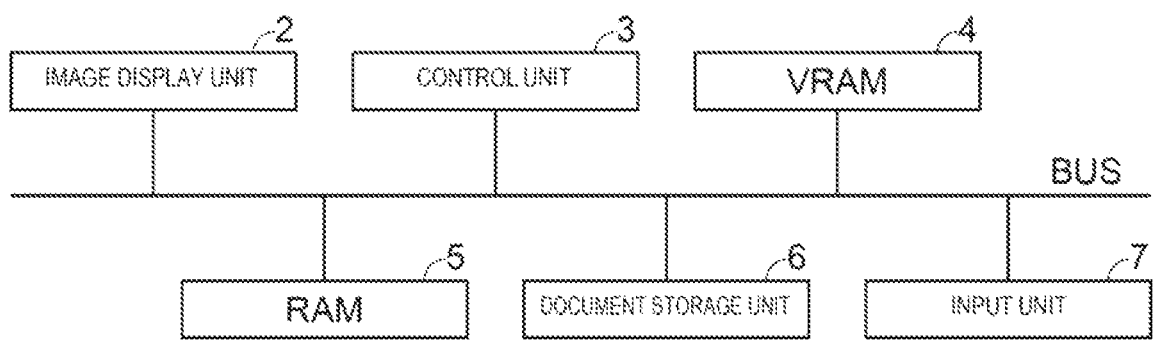
FIG. 3 is the block diagram showing a system configuration of a viewer.
Figure 4:
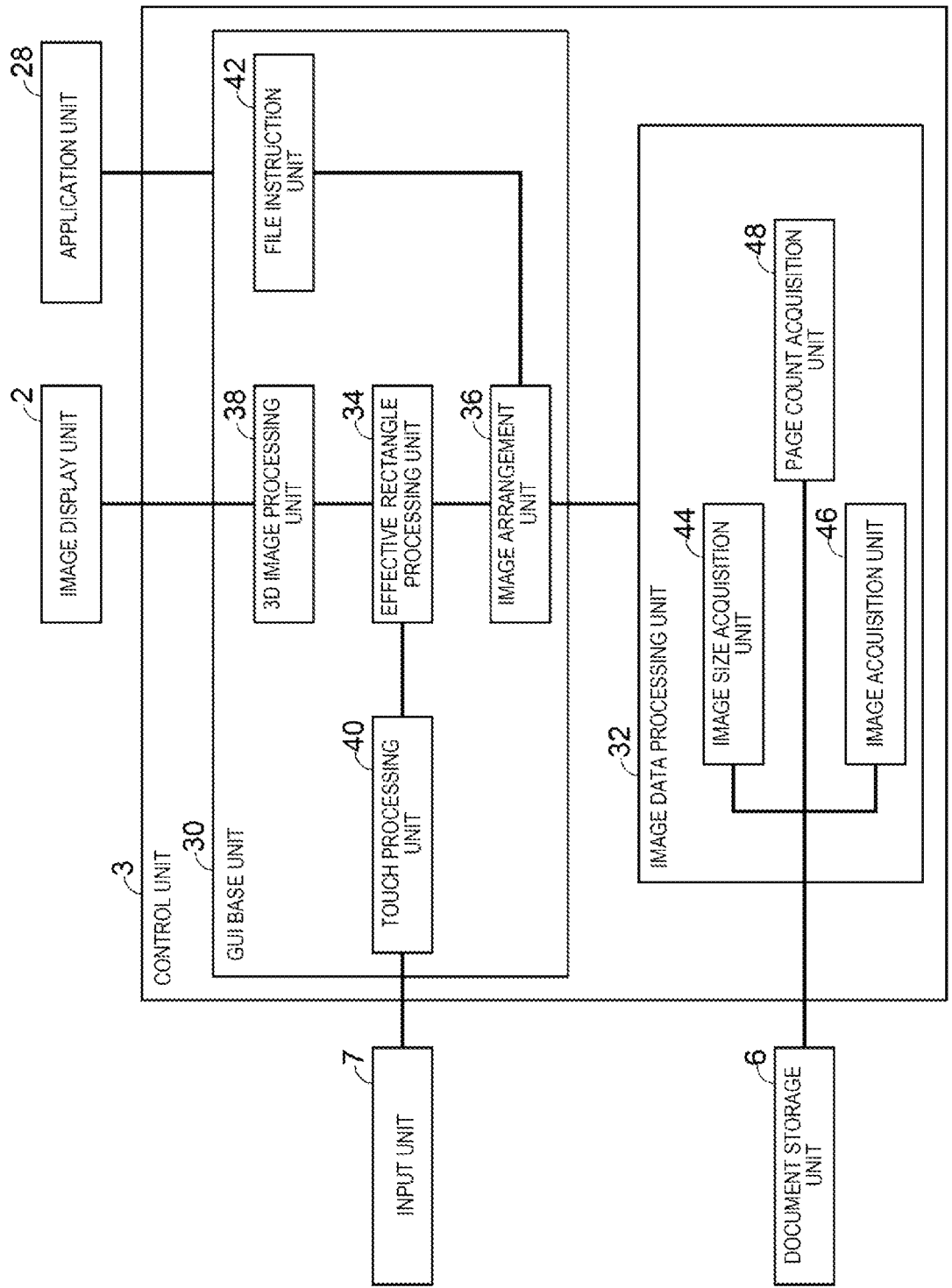
FIG. 4 is a block diagram showing a system configuration of the viewer.

FIGS. 3 and 4 are block diagrams showing a system configuration of the viewer 10.

As shown in FIG. 3, the viewer 10 includes the image display unit 2 coupled to a bus BUS, a control unit 3, a video random access memory (VRAM) 4, a random access memory (RAM) 5, a document storage unit 6, and the input unit 7. Signals or information between the units coupled to the bus BUS are transferred via the bus BUS.

The image display unit 2 displays the thumbnail image bundle G in which the plurality of thumbnail images T corresponding to each original image are arranged in the horizontal direction. When there is an enlargement instruction for enlarging and displaying the thumbnail image bundle G, the image display unit 2 displays the enlarged thumbnail image bundle G. As shown in FIG. 7E, which will be described later, the image display unit 2 displays a bird's-eye view image that is an image obtained by viewing the thumbnail image bundle G in which thumbnail images T arranged in a virtual space are arranged in the horizontal direction from any viewpoint in the virtual space including a first virtual rotation axis Q as a first virtual axis and a second virtual rotation axis M as a second virtual axis.

The image display unit 2 includes a display drive circuit (not shown) that outputs a signal for displaying an image on a liquid crystal panel or the like. The image display unit 2 displays image data stored in the VRAM 4 as an image.

The control unit 3 is a device that controls each unit of the viewer 10, for example, is a microcomputer having a central processing unit (CPU), a read only memory (ROM), or the like. The CPU executes a program stored in the ROM or RAM 5 using the RAM 5 as a work area. The ROM stores, for example, an operating system (OS) program for controlling basic operations of the viewer 10.

The control unit 3 controls each unit of the viewer 10 based on the program stored in the ROM. For example, the control unit 3 performs control to store various image data in the VRAM 4, and performs control to operate the viewer 10 based on the operated buttons 7A to 7F, the touch panel 7G, or the content by specifying the buttons 7A to 7F, the touch panel 7G, or the content operated by a user from the input signal sent from the input unit 7. Further, the control unit 3 controls image processing with respect to the image displayed on the image display unit 2. As the image processing, for example, processing such as an enlargement display of the thumbnail image bundle G according to an enlargement instruction, an enlargement display of a selection page, or a highlight display for the thumbnail images T is performed.

The VRAM 4 is a memory that stores image data indicating an image to be displayed on the image display unit 2. The VRAM 4 is a memory that stores the developed image data. The image data stored in the VRAM 4 is displayed on the image display unit 2.

The RAM 5 is a memory in which the content of the image processing executed by the control unit 3 and the association with the image data are stored.

A document storage unit 6 is a rewritable memory, and stores document data such as an electronic manual, an electronic book, or a document created by a user. The document storage unit 6 can store a plurality of different document data and can appropriately rewrite the document data. The document storage unit 6 is a non-volatile memory that stores various data and application programs in addition to the document data. The document storage unit 6 may be, for example, a semiconductor memory built in the viewer 10 or a removable external memory such as an SD memory card.

The input unit 7 includes the buttons 7A to 7F shown in FIG. 1. When the buttons 7A to 7F are operated, the input unit 7 transmits the input signal corresponding to the operated button to the control unit 3. The input unit 7 includes the touch panel 7G.

As shown in FIG. 4, the control unit 3 includes a GUI base unit 30 as an image generation unit and an image data processing unit 32.

The GUI base unit 30 causes each of the plurality of thumbnail images T arranged on the first virtual rotation axis Q to rotate about each second virtual rotation axis M intersecting the first virtual rotation axis Q and further to rotate about the first virtual rotation axis Q, and then generates the thumbnail images T. The GUI base unit 30 generates a bird's-eye view image that is an image of the thumbnail image bundle G arranged in the virtual space from any viewpoint in the virtual space.

The GUI base unit 30 includes an effective rectangle processing unit 34, an image arrangement unit 36, a 3D image processing unit 38, a touch processing unit 40, and a file instruction unit 42.

The effective rectangle processing unit 34 sets a thumbnail image display area.

The image arrangement unit 36 determines a rotation angle θ of the thumbnail image T that rotates about the second virtual rotation axis M. Based on the determined rotation angle θ, the GUI base unit 30 generates a thumbnail image T.

The image arrangement unit 36 divides the thumbnail image bundle G consisting of the plurality of thumbnail images T into the static portion 52, in which the thumbnail images T are arranged at equal intervals, in a state where a part of the thumbnail image T is displayed by being overlapped with an adjacent thumbnail image T and the dynamic portion 50, in which the interval between the thumbnail images T adjacent to each other is arranged wider than the interval between the thumbnail images T in the static portion 52, and calculates a common standard page pitch of the static portion 52 and the dynamic portion 50.

The image arrangement unit 36 calculates a width of a spread page and a width shared by the pages of the dynamic portion 50. Further, a cumulative normal distribution is calculated when the vertically long thumbnail images T and the horizontally long thumbnail images T are mixed in the dynamic portion 50 of the thumbnail image bundle G.

The image arrangement unit 36 performs the above-described calculation and determines arrangement positions of the plurality of thumbnail images T constituting the thumbnail image bundle G.

The 3D image processing unit 38 is, for example, a Frame Buffer or a GPU.

The touch processing unit 40 detects a user touch on the touch panel 7G. The touch processing unit 40 acquires a touch signal from the touch panel 7G.

The file instruction unit 42 instructs the image data processing unit 32 to read an original image of a document data page based on the data supplied from the touch processing unit 40. The file instruction unit 42 is, for example, an Android (registered trademark) function of an operating system for mobile devices.

The image data processing unit 32 is, for example, a PDF library.

The image data processing unit 32 includes an image size acquisition unit 44, an image acquisition unit 46, and a page count acquisition unit 48.

The image size acquisition unit 44 acquires a length of an original image of a document data page in a horizontal direction from the document storage unit 6. The image size acquisition unit 44 acquires a length of an original image of a document data page in a vertical direction from the document storage unit 6.

The image acquisition unit 46 acquires an original image of a document data page from the document storage unit 6.

The page count acquisition unit 48 acquires the number of pages of document data from the document storage unit 6.

An application unit 28 is application software such as printing software for photographs and documents, New Year's card printing software, or projection software for projecting photographs, documents or the like with a projector.

Operation of Viewer

Next, the operation of the viewer will be described with reference to FIGS. 5 to 10.

Figure 5:
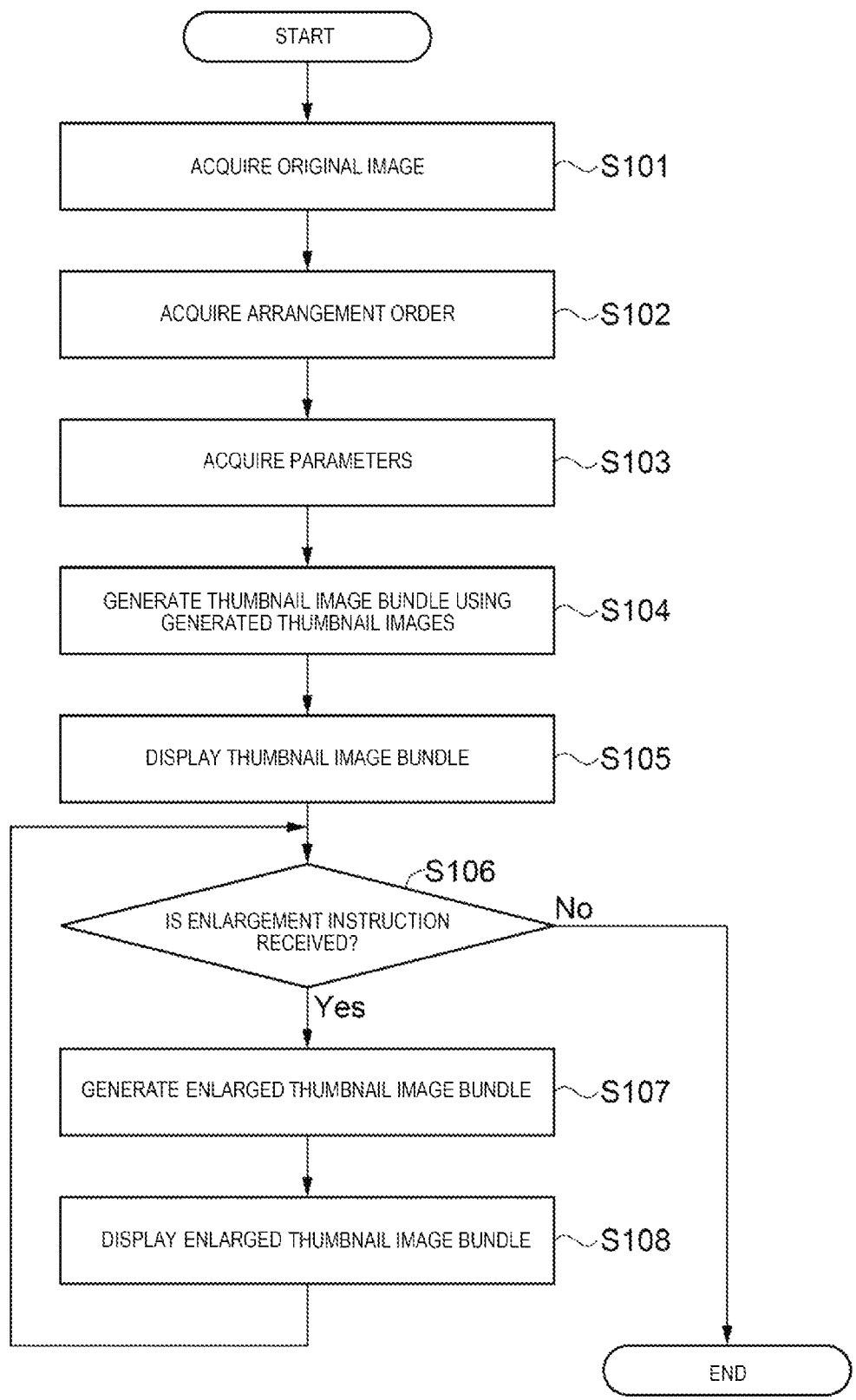
FIG. 5 is a flowchart showing an example of processing of the viewer.
Figure 6:
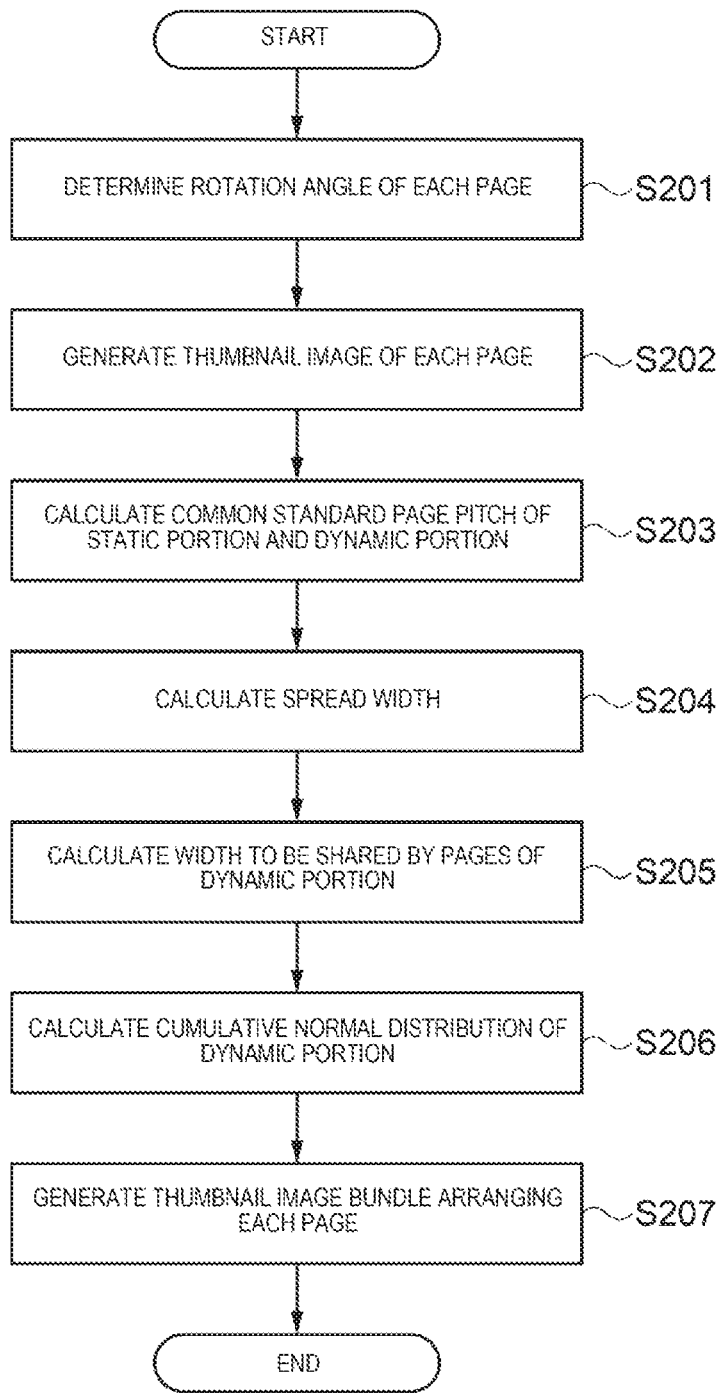
FIG. 6 is a flowchart showing an example of processing of the viewer.
Figure 7A:
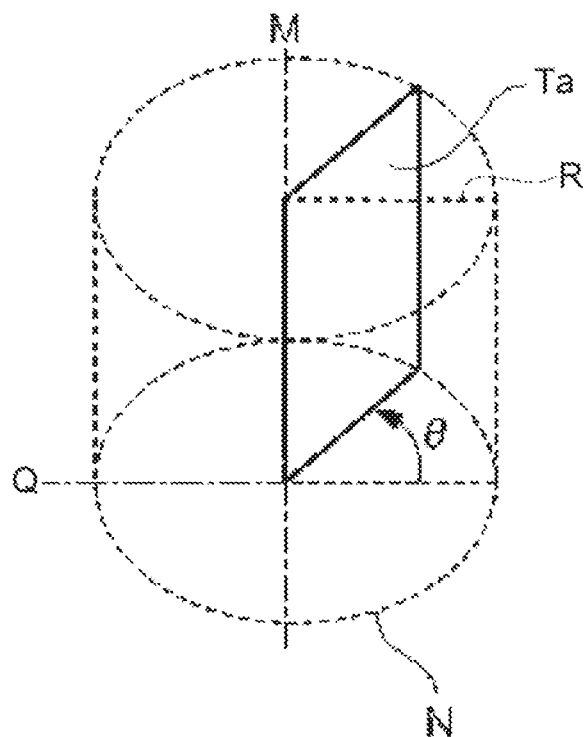
FIG. 7A is a diagram for explaining generation processing of a thumbnail image.
Figure 7B:
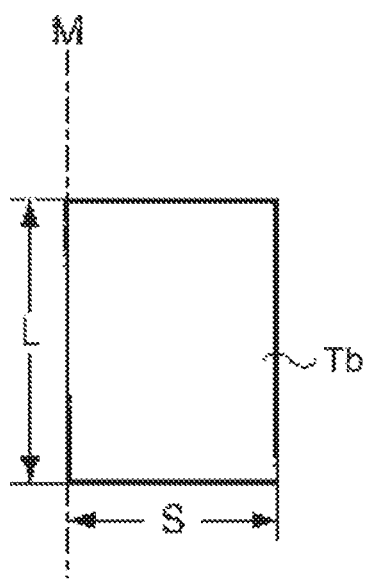
FIG. 7B is a diagram for explaining the generation processing of the thumbnail image.
Figure 7C:
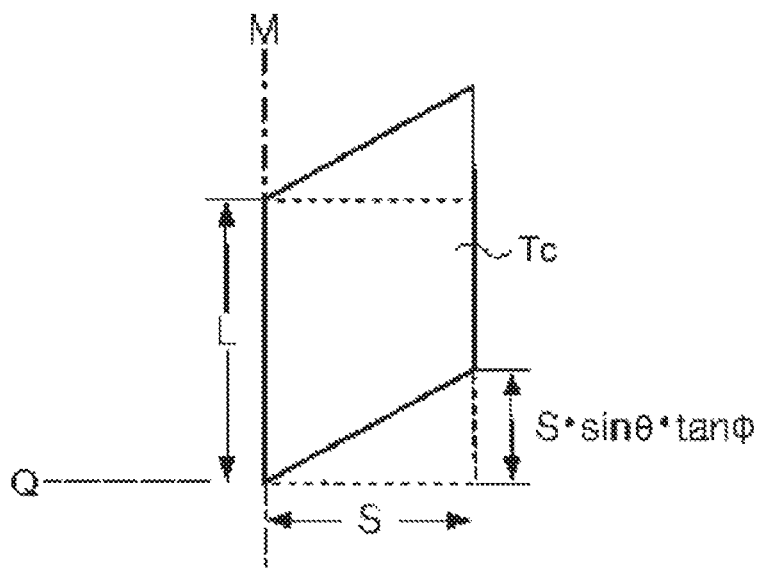
FIG. 7C is a diagram for explaining the generation processing of the thumbnail image.
Figure 7D:
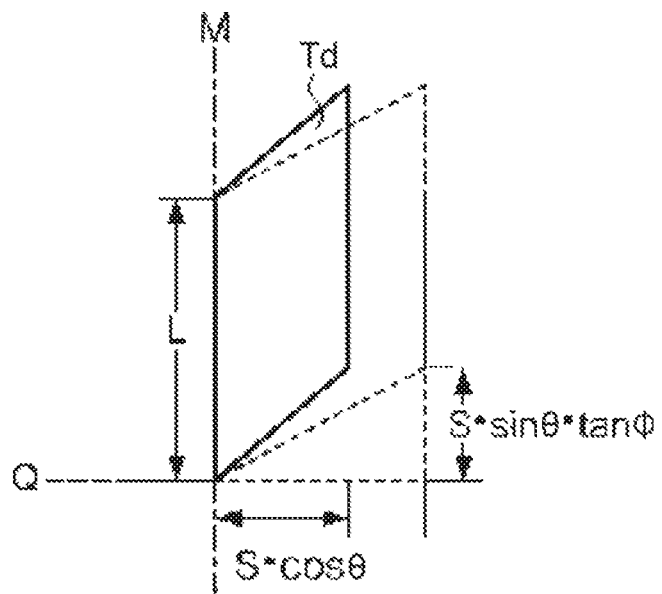
FIG. 7D is a diagram for explaining the generation processing of the thumbnail image.
Figure 7E:
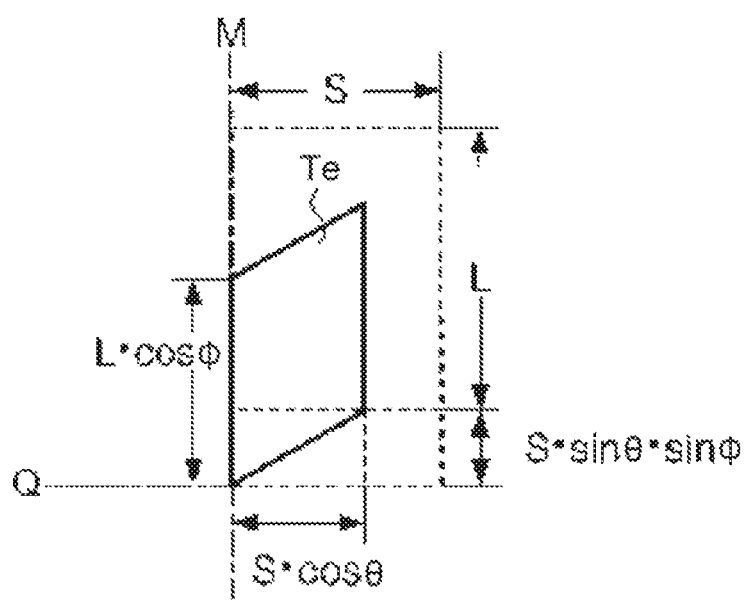
FIG. 7E is a diagram for explaining the generation processing of the thumbnail image.
Figure 8:
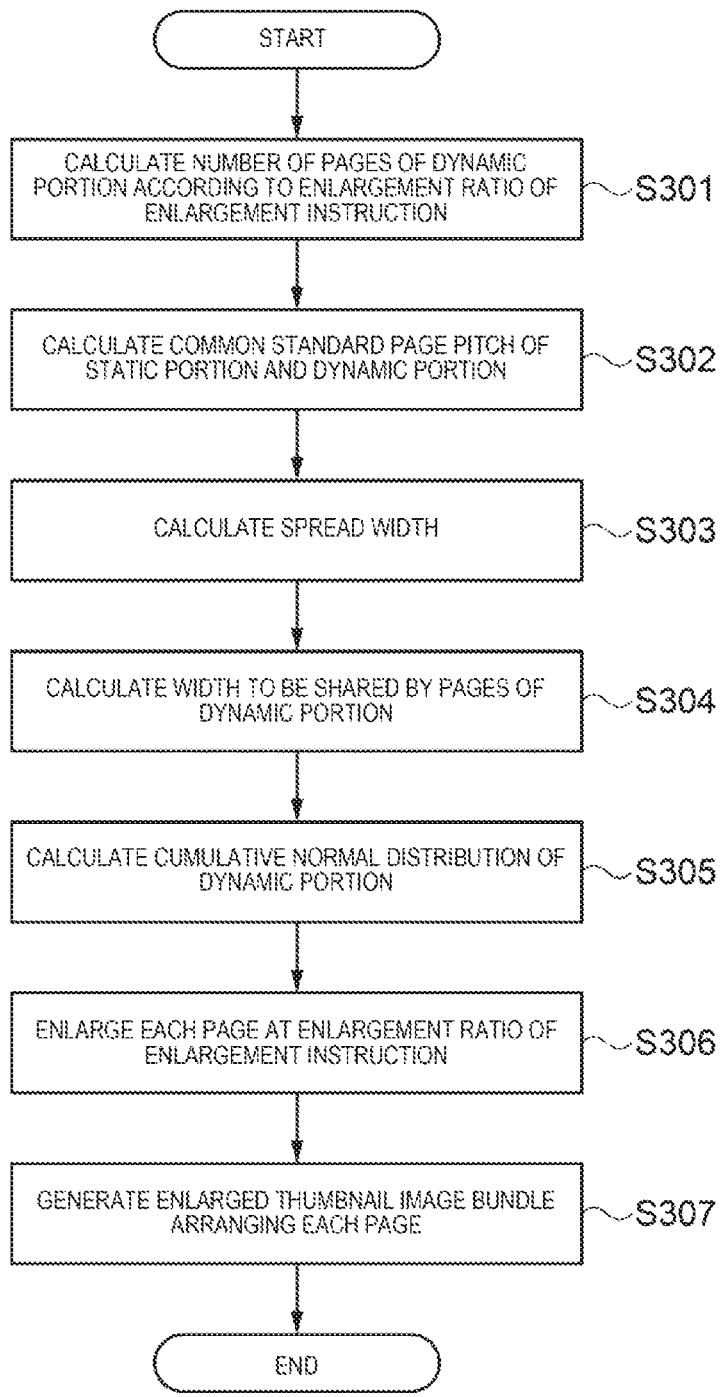
FIG. 8 is a flowchart showing an example of processing of the viewer.
Figure 9:
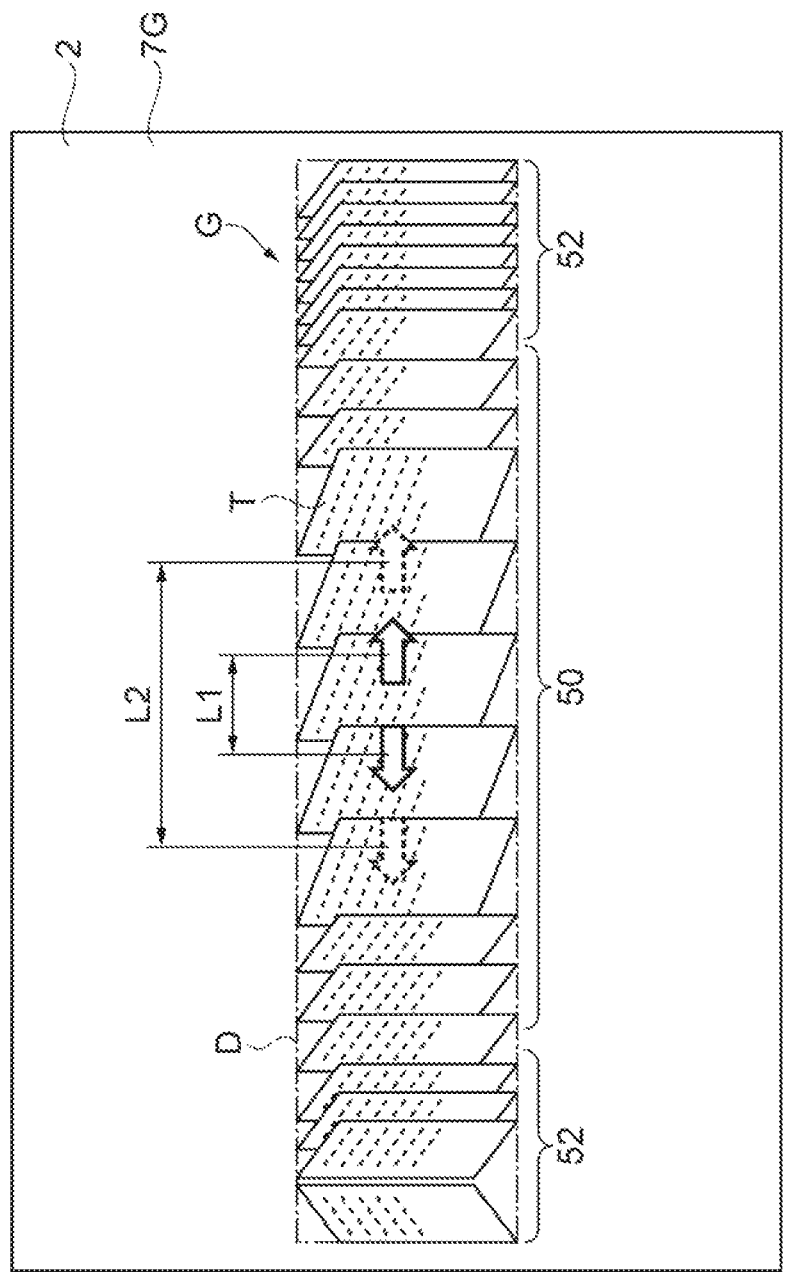
FIG. 9 is a diagram explaining a display method for enlarging and displaying the thumbnail image bundle.
Figure 10:
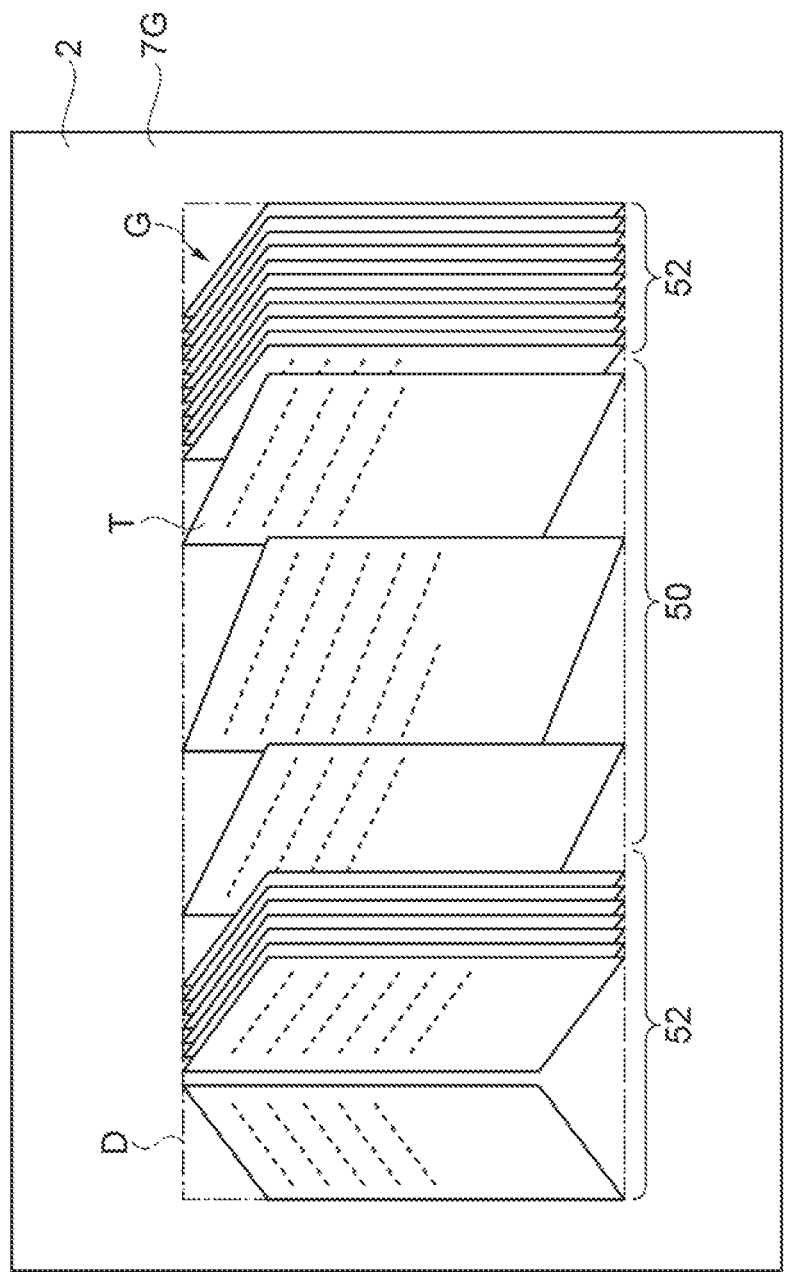
FIG. 10 is a diagram explaining the display method for enlarging and displaying the thumbnail image bundle.

FIGS. 5, 6, and 8 are flowcharts showing an example of processing of the viewer 10. FIGS. 7A to 7E are diagrams for explaining the generation processing of the thumbnail image. FIGS. 9 and 10 are diagrams for explaining the display method for enlarging and displaying the thumbnail image bundle. Hereinafter, the operation of the control unit 3 will be described with reference to FIG. 2 along the flowchart of FIG. 5.

The control unit 3 generates a thumbnail image bundle G in which the generated thumbnail images T are arranged in ascending order of page numbers from the right side to the left side of the image display unit 2.

When the enlargement instruction of the thumbnail image bundle G is received, the control unit 3 enlarges the length in the vertical direction of the occupied rectangle D, in which the thumbnail image bundle G shown in FIGS. 9 and 10 described later is occupied, and when the enlargement ratio of the enlargement instruction increases, the thumbnail image T of the dynamic portion 50 is moved to the static portion 52 and the number of thumbnail images T of the dynamic portion 50 is reduced. Thereafter, the length in the horizontal direction and the length in the vertical direction of each thumbnail image T are enlarged at the enlargement ratio specified by the enlargement instruction, and the enlarged thumbnail image bundle G arranged side by side in the horizontal direction is generated.

The image arrangement unit 36 divides the thumbnail image bundle G into the static portion 52 and the dynamic portion 50, calculates the arrangement position of the thumbnail image T in the static portion 52 and the arrangement position of the thumbnail image T in the dynamic portion 50, and determines the arrangement positions of the plurality of thumbnail images T consisting of the thumbnail image bundle G.

In the dynamic portion 50, the image arrangement unit 36 determines the arrangement of the thumbnail images T so that the adjacent thumbnail images T positioned at the center of the dynamic portion 50 in the horizontal direction are in contact with each other or an overlapping ratio of the adjacent thumbnail images T becomes smaller.

The flow in FIG. 5 is started when a predetermined event occurs, for example, the viewer 10 is turned on or the viewer 10 is instructed to display a menu screen, for example.

First, in step S101, the control unit 3 acquires the thumbnail image bundle G to be processed, in this example, the original images of the plurality of thumbnail images T included in the thumbnail image bundle G from the document storage unit 6.

Next, in step S102, the control unit 3 acquires data indicating an arrangement order of the plurality of thumbnail images T from the document storage unit 6. The data includes an identifier of the thumbnail image T and a number indicating the arrangement order.

Next, in step S103, the control unit 3 acquires parameters used for displaying the thumbnail image bundle G. These parameters are stored in the document storage unit 6 together with the identifier of the thumbnail image bundle G. The parameters acquired here include the number of images and the width dimension of the images. The number of images is a parameter indicating the number of thumbnail images T included in the thumbnail image bundle G. The width dimension of the image is a parameter indicating the length of the thumbnail image bundle G in the horizontal direction.

Next, in step S104, the control unit 3 generates a thumbnail image bundle G using the thumbnail images T generated by the GUI base unit 30. Specifically, the control unit 3 reduces or enlarges the original image acquired by the GUI base unit 30 in step S101, and generates a thumbnail image bundle G using the generated thumbnail images T.

Hereinafter, an operation of generating the thumbnail images T and arranging the thumbnail images T to generate the thumbnail image bundle G by the control unit 3 will be described with reference to FIGS. 7A to 7E along the flowchart in FIG. 6.

First, in step S201, the image arrangement unit 36 determines the rotation angle θ in which each page shown in FIG. 7A, which will be described later, rotates about the second virtual rotation axis M. The rotation angle θ of each page is calculated according to a predetermined normal distribution of the rotation angle θ.

Next, in step S202, the control unit 3 generates a thumbnail image T of each page. Specifically, in the GUI base unit 30, each of the plurality of thumbnail images T arranged on the first virtual rotation axis Q rotates about each second virtual rotation axis M intersecting the first virtual rotation axis Q and further rotate about the first virtual rotation axis Q, and then the thumbnail images T are generated.

As shown in FIG. 7A, the GUI base unit 30 arranges a page Ta so as to stand on the first virtual rotation axis Q set on a virtual horizontal plane N in the virtual space. Thereafter, with each second virtual rotation axis M intersecting the first virtual rotation axis Q as the center, the GUI base unit 30 rotates the page Ta from a reference position R in which the horizontal direction of the page Ta is parallel to the horizontal direction of the display area at the rotation angle θ. Furthermore, the GUI base unit 30 generates an image obtained by rotating the page Ta, which is rotated about each second virtual rotation axis M in the virtual space, about the first virtual rotation axis Q at a depression angle φ (not shown). That is, the GUI base unit 30 generates an image in which the page Ta is obliquely looked down at the depression angle φ (not shown) from a viewpoint above the upper side of the page Ta rotated about the second virtual rotation axis M in the virtual space. In other words, each thumbnail image is generated as an image in which the page Ta is obliquely viewed at the depression angle φ (not shown) and viewed in a bird's-eye view from the viewpoint above the upper side of page Ta in the virtual space. When the page is not rotated, the horizontal direction of the page is parallel to the horizontal direction of the display area, and the rotation angle θ is 0°. The depression angle φ is a predetermined angle. Further, the second virtual rotation axis M is not limited to a configuration that is parallel along the side in the second direction, which is the vertical direction of the page, and may be a configuration that intersects the side in the horizontal direction of the page.

Specifically, first, the GUI base unit 30 applies vertical direction deformation with respect to the image Tb, which is shown in FIG. 7B when each page is viewed from the front, while preventing the horizontal width from being changed as shown in FIG. 7C, and generates an image Tc in which the right side of the image Tb in FIG. 7B is shifted from the left side by $S \cdot \sin θ \cdot \tan φ$. Next, as shown in FIG. 7D, the GUI base unit 30 generates an image Td obtained by reducing the image Tc in FIG. 7C in the horizontal direction at a magnification of $\cos θ$. As a result, the horizontal width of the image Td is $S \cdot \cos θ$. Finally, as shown in FIG. 7E, the GUI base unit 30 generates an image Te obtained by reducing the image Td in FIG. 7D in the vertical direction at a magnification of cow. As a result, the vertical direction dimension of the image Te becomes $L \cdot \cos φ$. In this way, the thumbnail image T is generated in which the page is rotated about the second virtual rotation axis M at the rotation angle θ and is further rotated about the first virtual rotation axis Q. In other words, the thumbnail image T is generated when the page is rotated about the second virtual rotation axis M at the rotation angle θ and the page is looked down at the depression angle φ from the viewpoint above the upper side of the page.

Returning to FIG. 6, in step S203, the image arrangement unit 36 calculates the common standard page pitch La of the dynamic portion 50 and the static portion 52.

The standard page pitch La is calculated by "total occupied width*standard page pitch occupied width ratio/(the number of pages−1)". When the page pitch is a predetermined normal distribution, the page pitch of the static portion 52 becomes the standard page pitch La, and the page pitch of the dynamic portion 50 becomes a pitch in which a page pitch LX according to the normal distribution is inserted between the standard page pitch La. The total occupied width is a length Wmax obtained by adding the total page pitch of the static portion 52 and the total page pitch of the dynamic portion 50, and further adding one page pitch of the static portion 52. The standard page pitch occupation width ratio is a ratio of the length Wa of the standard page pitch occupation width excluding the page pitch LX of the dynamic portion 50 with respect to the length Wmax of the total occupation width.

Next, in step S204, the image arrangement unit 36 calculates the spread width. Note that the spread is where the right-facing thumbnail image T and the left-facing thumbnail image T arranged in the static portion 52 shown in FIG. 2 are adjacent to each other.

Next, in step S205, the image arrangement unit 36 calculates a width to be shared by the pages of the dynamic portion 50.

The width shared by the pages of the dynamic portion 50 is calculated by "total occupied width*(1−standard page pitch occupied width ratio)−actual display width of spread".

Next, in step S206, the image arrangement unit 36 calculates a cumulative normal distribution when the vertically long thumbnail image T and the horizontally long thumbnail image T are mixed in the dynamic portion 50. By calculating the cumulative normal distribution, it is possible to calculate the arrangement when the vertically long thumbnail image T or the horizontally long thumbnail image T are mixed in the dynamic portion 50.

Next, in step S207, the image arrangement unit 36 calculates the X coordinate of each page based on each value calculated above, arranges the thumbnail image T generated by the GUI base unit 30 on the first virtual rotation axis Q based on the X coordinate of each page, and generates the thumbnail image bundle G. The X coordinate is a length in the X-axis direction which is the horizontal direction from a left side end portion, when the left side end portion of both end portions, which is facing the horizontal direction of the first page, is set to zero.

Through the above flow, the thumbnail image bundle G, in which the plurality of thumbnail images T generated by the GUI base unit 30 are arranged at the X coordinate position calculated by the image arrangement unit 36, is generated.

Returning to FIG. 5, in step S105, the control unit 3 displays the thumbnail image bundle G, which is arranged in the ascending order of page numbers from the right side to the left side along the horizontal direction of the image display unit 2, on the image display unit 2.

Next, in step S106, when the enlargement instruction for enlarging and displaying the thumbnail image bundle G is not received, "No" is determined and the operation is ended.

Further, when the enlargement instruction for enlarging and displaying the thumbnail image bundle G is received, "Yes" is determined and the process proceeds to step S107, then an enlarged thumbnail image bundle G is generated.

Hereinafter, the operation in which the control unit 3 enlarges and displays the thumbnail image bundle G will be described with reference to FIGS. 9 and 10 along the flowchart in FIG. 8. FIG. 9 shows the thumbnail image bundle G before enlargement, and FIG. 10 shows the thumbnail image bundle G after the enlargement.

First, in step S301, the control unit 3 calculates the number of pages of the dynamic portion 50 according to the enlargement ratio of the enlargement instruction.

As shown in FIG. 9, the enlargement instruction for enlarging and displaying the thumbnail image bundle G is an operation that a user touches the thumbnail image bundle G before enlargement display with two fingers and pinch out to expand the distance between the two fingers in the horizontal direction.

The enlargement ratio is determined by a ratio "L2/L1" between the finger interval L1 before the pinch out and the finger interval L2 after the pinch out, for example, when "L2/L1" is 2, the enlargement ratio of the thumbnail image bundle G is set to 140%. The relationship between "L2/L1" and the enlargement ratio is stored in the RAM 5. Therefore, the control unit 3 detects "L2/L1" of the pinch out, selects a corresponding enlargement ratio from the RAM 5, and enlarges the thumbnail image bundle G.

In a case where the thumbnail image bundle G is enlarged, when the horizontal direction and the vertical direction of the thumbnail image bundle G are enlarged at the same magnification, the horizontal direction of the thumbnail image bundle G protrudes from the image display unit 2. Therefore, when only the length in the vertical direction of the occupied rectangle D in which the thumbnail image bundle G is occupied, that is, the occupied rectangle D surrounding the outer edge of the thumbnail image bundle G is enlarged, and the enlargement ratio of the enlargement is increased, among the thumbnail images T arranged in the dynamic portion 50, the thumbnail images T are moved to the static portion 52 in the order closest to the static portion 52, and the number of thumbnail images T arranged in the dynamic portion 50 is reduced. Thus, by leaving the length in the horizontal direction of the occupied rectangle D in which the thumbnail image bundle G is occupied as it is and enlarging only the length in the vertical direction of the occupied rectangle D, the enlarged thumbnail image bundle G can be displayed in the image display unit 2.

Therefore, in step S301, the control unit 3 calculates the number of pages of the dynamic portion 50 according to the enlargement ratio of the enlargement instruction from the relational expression between the enlargement ratio stored in the RAM 5 and the number of pages of the dynamic portion 50.

Next, since the number of pages of the dynamic portion 50 has decreased in step S302, the image arrangement unit 36, like the above-described step S203, recalculates the common standard page pitch La between the dynamic portion 50 and the static portion 52.

Next, in step S303, as in step S204 described above, the image arrangement unit 36 recalculates the spread width.

Next, in step S304, as in step S205 described above, the image arrangement unit 36 recalculates the width shared by the pages of the dynamic portion 50.

Next, in step S305, as in step S206 described above, the image arrangement unit 36 recalculates the cumulative normal distribution when the dynamic portion 50 has a spread.

Next, in step S306, the GUI base unit 30 enlarges the thumbnail image T of each page at the enlargement ratio of the enlargement instruction. In other words, each thumbnail image T is enlarged at the same magnification in the horizontal direction and the vertical direction.

Next, in step S307, as in step S207 described above, the image arrangement unit 36 calculates the X coordinate of each page based on each value calculated above, and the control unit 3 arranges the thumbnail image T generated by the GUI base unit 30 on the first virtual rotation axis Q based on the X coordinate of each page and generates the enlarged thumbnail image bundle G.

Through the above flow, the enlarged thumbnail image bundle G, in which the plurality of enlarged thumbnail images T generated by the GUI base unit 30 are arranged at the X coordinate positions calculated by the image arrangement unit 36, is generated.

Figure 2:
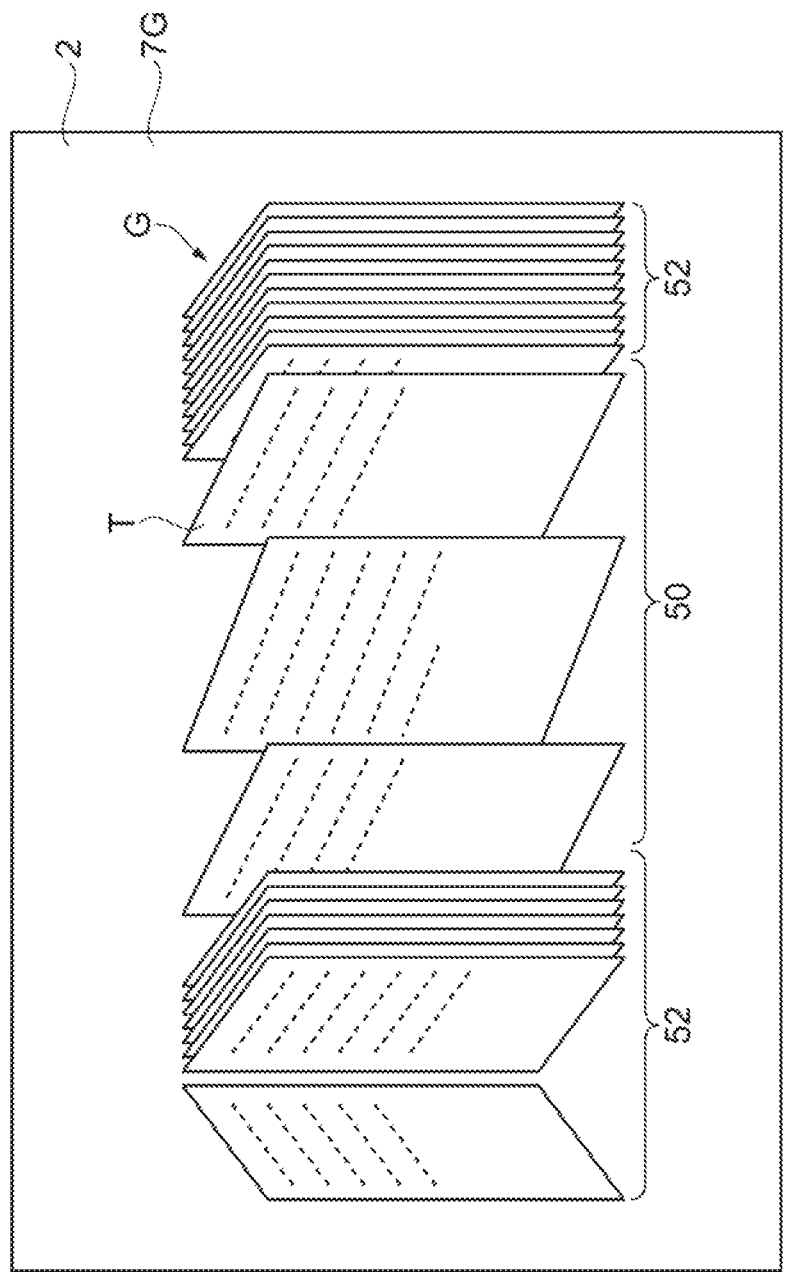
FIG. 2 is a diagram showing a thumbnail image bundle, which is enlarged and displayed, displayed on an image display unit.

Returning to FIG. 5, in step S108, as shown in FIG. 2 or FIG. 10, the control unit 3 displays the enlarged thumbnail image bundle G, which is arranged in the ascending order of page numbers from the right side to the left side along the horizontal direction of the image display unit 2, on the image display unit 2.

Next, returning to step S106, when an enlargement instruction is received again, "Yes" is determined, the process proceeds to step S107, and the operation of enlarging and displaying the thumbnail image bundle G is repeated again. When the enlargement instruction is not received, "No" is determined and the operation of enlargement display is ended.

The various calculation values calculated in each step are stored in the RAM 5 for each page, and are read from the RAM 5 and used for various calculations whenever necessary for the calculation.

In the present embodiment, a case is described in which the enlargement instruction of the thumbnail image bundle G by a pinch out operation or the like is received. However, when a reduction instruction of the thumbnail image bundle G by a pinch in operation or the like is received, the length in the vertical direction of the occupied rectangle D, in which the thumbnail image bundle G is occupied, is reduced according to the reduction instruction, and when the reduction ratio of the reduction increases, the reduced thumbnail image bundle G may be displayed by moving the thumbnail image T of the dynamic portion 50 to the static portion 52 and reducing the number of thumbnail images T of the dynamic portion 50.

According to the viewer 10 or the display method as the display apparatus as described above, when the enlargement instruction of the thumbnail image bundle G is received, the entire thumbnail image bundle G is not enlarged as it is, but the length in the vertical direction of the occupied rectangle D, in which the thumbnail image bundle G is occupied, is expanded according to the enlargement ratio of the enlargement instruction. Therefore, by reducing the number of the thumbnail images T arranged in the dynamic portion 50 according to the enlargement ratio, the thumbnail image T arranged in the dynamic portion 50 can be enlarged the length in the horizontal direction and the length in the vertical direction of each thumbnail image T at the enlargement ratio, which is instructed to enlarge, without changing the length of the entire thumbnail image bundle G in the horizontal direction. Therefore, it is possible to simultaneously check the description content of the plurality of thumbnail images T arranged in the dynamic portion 50. Further, since the thumbnail image T arranged in the static portion 52 is enlarged and displayed with a part of the adjacent thumbnail image T overlapping, a part of the description content of the thumbnail image T can be checked at the same time.

By configuring the thumbnail image bundle G in which the plurality of thumbnail images T, which are arranged on the first virtual rotation axis Q, rotated about the each of second virtual rotation axes M intersecting with the first virtual rotation axis Q, and further rotated about the first virtual rotation axis Q, are arranged in the horizontal direction, it is possible to have a bird's-eye view of the description content of the plurality of thumbnail images T constituting the thumbnail image bundle G.

Further, by displaying the adjacent thumbnail images T arranged in the dynamic portion 50 so as to be in contact with each other or displaying so that an overlapping ratio of the adjacent thumbnail images T becomes smaller, the description content of the thumbnail images T arranged in the dynamic portion 50 can be easily checked.

Next, a display method different from the display method for enlarging and displaying the thumbnail image bundle G described above, will be described with reference to Display Example 1 and Display Example 2.

Display Example 1

A display method for enlarging and displaying the thumbnail image bundle G when the length of the image display unit 2 in the horizontal direction is shorter than the length in the vertical direction will be described with reference to FIGS. 11 and 12.

Figure 11:
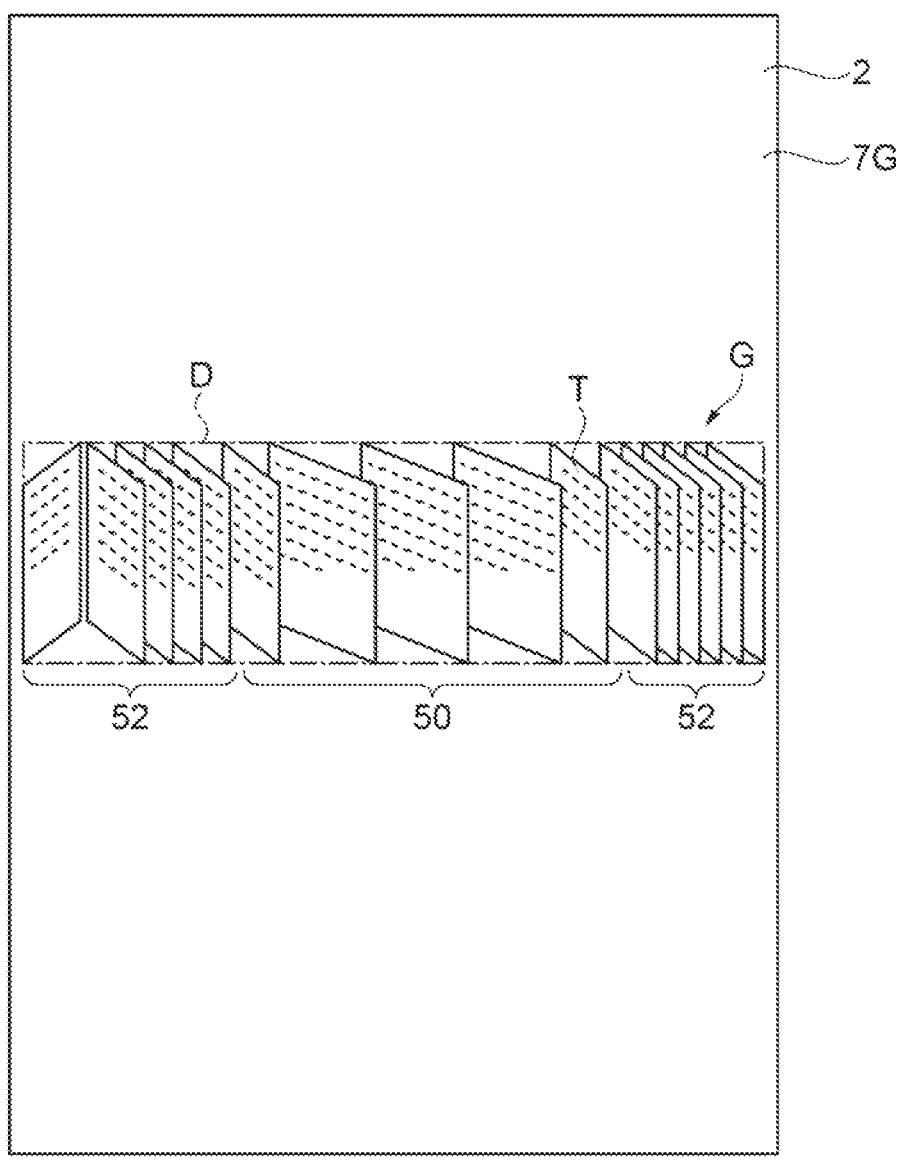
FIG. 11 is a diagram explaining the display method for enlarging and displaying the thumbnail image bundle on a vertically long image display unit.
Figure 12:
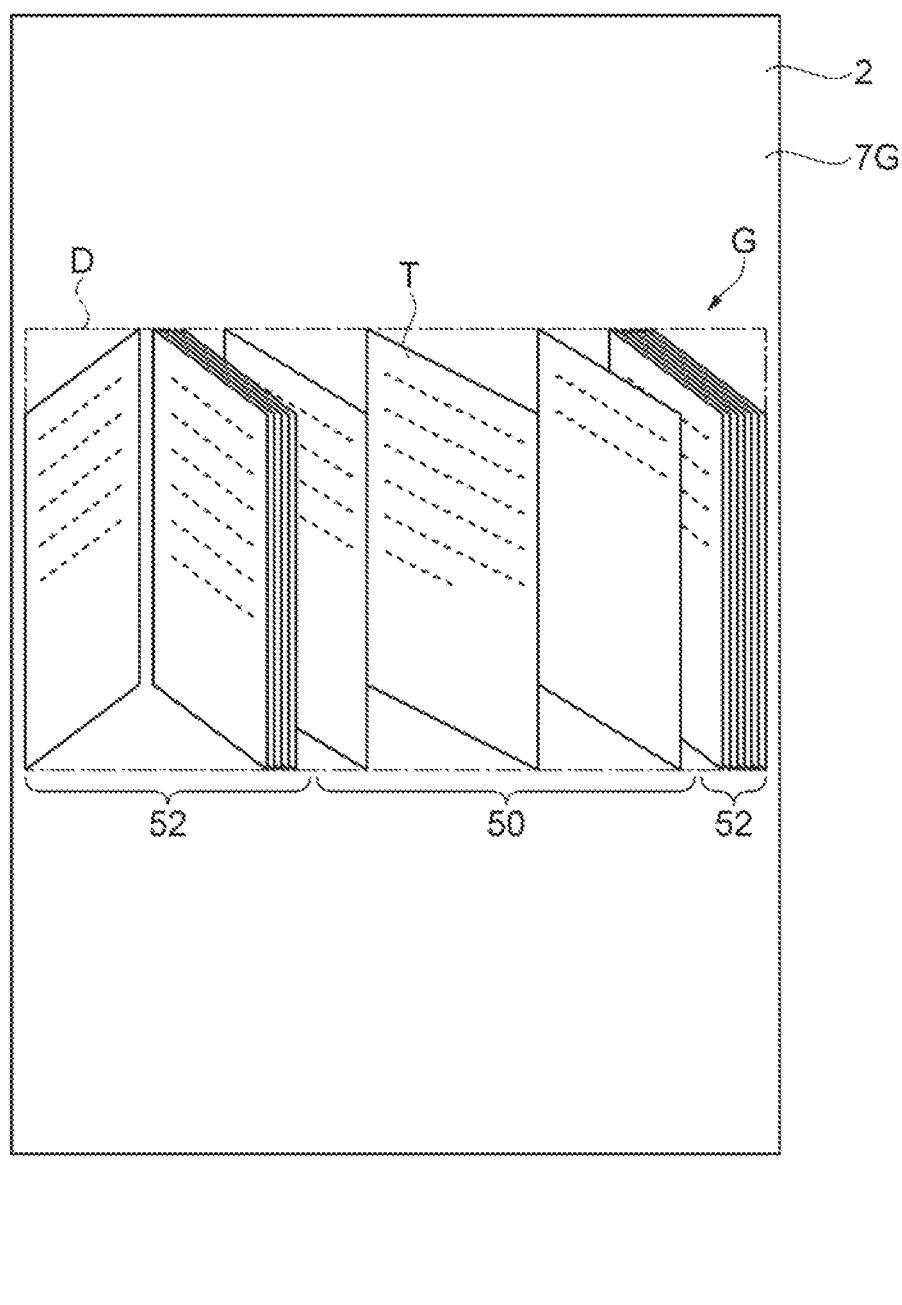
FIG. 12 is a diagram explaining the display method for enlarging and displaying the thumbnail image bundle on the vertically long image display unit.

FIGS. 11 and 12 are diagrams explaining the display method for enlarging and displaying a thumbnail image bundle on a vertically long image display unit. FIG. 11 shows the thumbnail image bundle G before enlargement, and FIG. 12 shows the thumbnail image bundle G after the enlargement. Configuration parts in the viewer 10 will be described with the same reference numerals as described above.

As shown in FIGS. 11 and 12, when the thumbnail image bundle G is enlarged and displayed on the image display unit 2 where the length in the horizontal direction is shorter than the length in the vertical direction, the length of the occupied rectangle D in the vertical direction can be greatly enlarged and displayed with respect to the length of the occupied rectangle D of the thumbnail image bundle G in the horizontal direction. Therefore, all the thumbnail images T arranged in the dynamic portion 50 are moved to the static portion 52, a plurality of thumbnail images T constituting the thumbnail image bundle G are all arranged in the static portion 52, and then it becomes impossible to check the description content of the thumbnail images T arranged in the dynamic portion 50. Further, a portion where the enlarged thumbnail image bundle G is not displayed on the image display unit 2 is generated. Therefore, when the thumbnail image bundle G is enlarged and displayed on the vertically long image display unit 2, the control unit 3 enlarges the thumbnail image bundle G by setting the maximum enlargement ratio stored in the RAM 5 to a predetermined enlargement ratio smaller than the enlargement ratio in the horizontally long image display unit 2, a so-called enlargement ratio at which a predetermined number of thumbnail images T are arranged in the dynamic portion 50.

According to this display method, in a case of the vertically long image display unit 2, when the thumbnail image bundle G in which the plurality of thumbnail images T are arranged in the horizontal direction is to be enlarged and displayed, the length of the occupied rectangle D of the thumbnail image bundle G in the vertical direction can be greatly enlarged and displayed. Therefore, all the thumbnail images T arranged in the dynamic portion 50 are moved to the static portion 52, so that the description content of the thumbnail images T cannot be checked. Further, the enlarged thumbnail image bundle G protrudes from the image display unit 2. Therefore, by setting the maximum enlargement ratio to a predetermined enlargement ratio smaller than the enlargement ratio in the horizontally long image display unit 2, a predetermined number of thumbnail images T arranged in the dynamic portion 50 are displayed, and the description content of the plurality of thumbnail images T arranged in the dynamic portion 50 can be easily checked.

Display Example 2

A display method for enlarging and displaying the plurality of thumbnail image bundles G displayed on the image display unit 2 will be described with reference to FIGS. 13 and 14.

Figure 13:
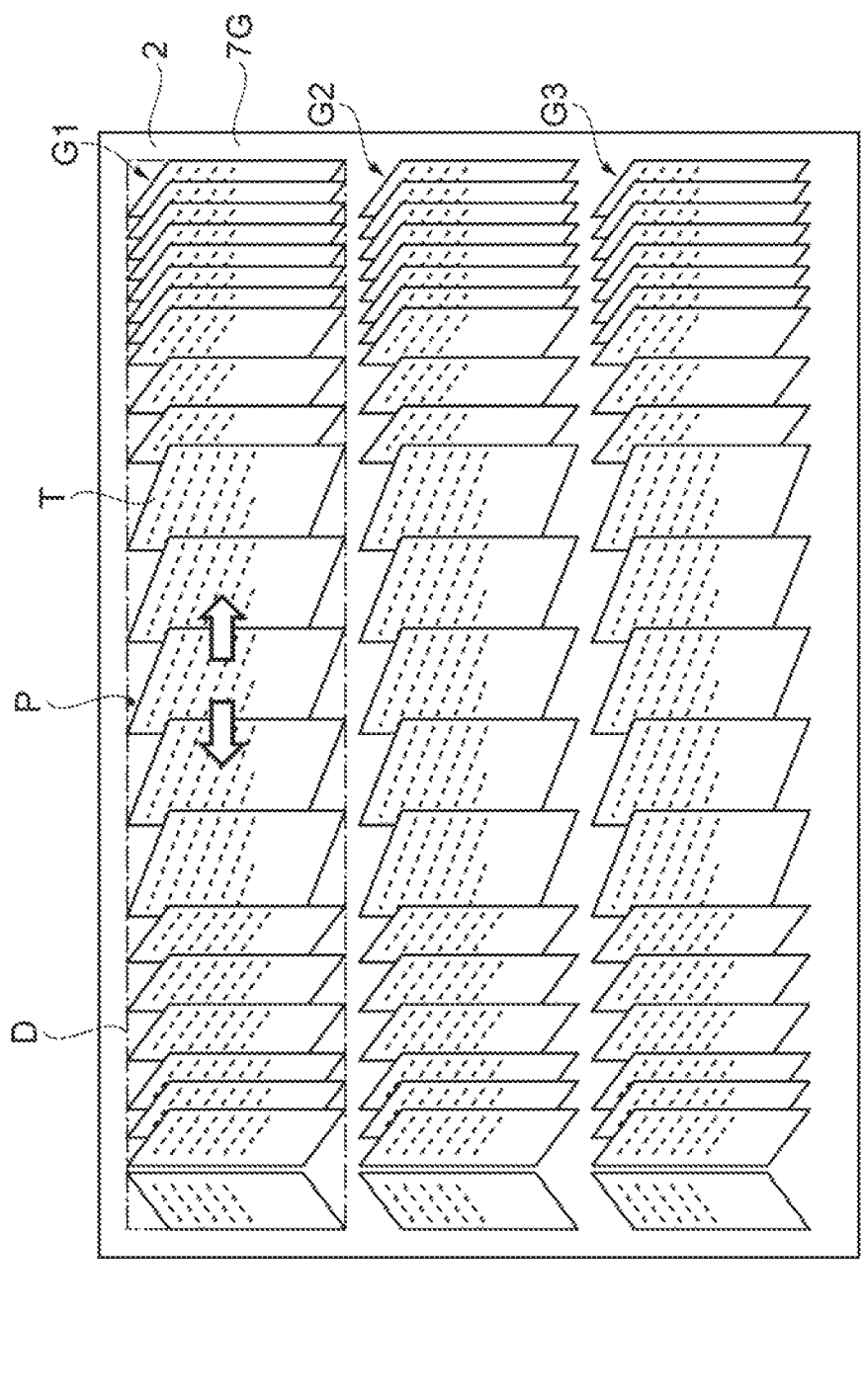
FIG. 13 is a diagram explaining the display method for enlarging and displaying a plurality of thumbnail image bundles.
Figure 14:
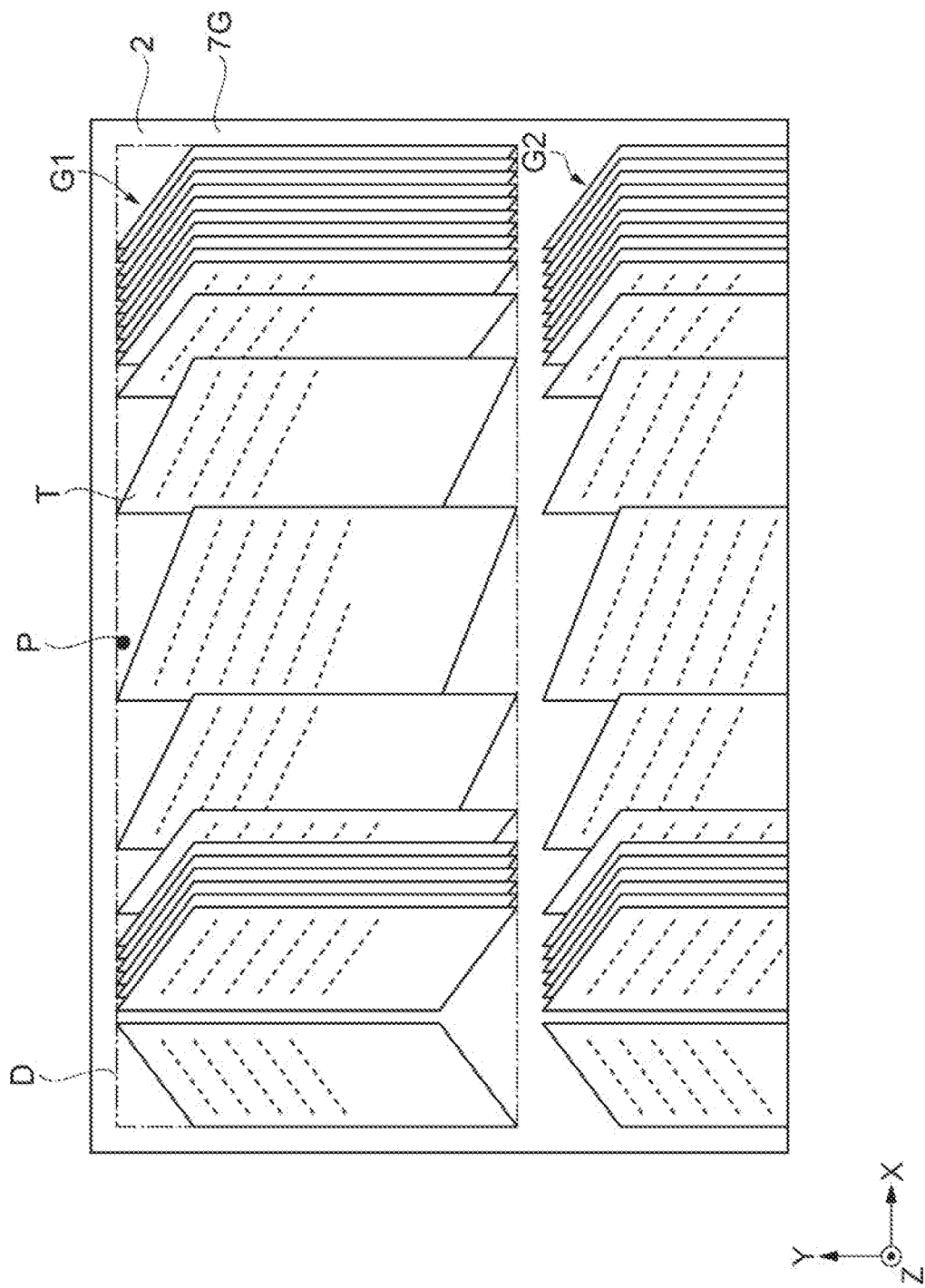
FIG. 14 is a diagram explaining the display method for enlarging and displaying the plurality of thumbnail image bundles.

FIGS. 13 and 14 are diagrams for explaining a display method for enlarging and displaying a plurality of thumbnail image bundles. FIG. 13 shows thumbnail image bundles G1, G2, and G3 before enlargement, and FIG. 14 shows thumbnail image bundles G1 and G2 after the enlargement. The configuration parts in the viewer 10 will be described with the same reference numerals as those described above.

As shown in FIGS. 13 and 14, a plurality of thumbnail image bundles G1, G2, and G3 arranged in the vertical direction are displayed on the image display unit 2. When the thumbnail image bundle G1, which is instructed to enlarge by a pinch out operation or the like, is enlarged and displayed, a predetermined position P in the occupied rectangle D of the thumbnail image bundle G1, for which the enlargement instruction is received, is set as a fixed point, and the length in the vertical direction of each of the occupied rectangles D of the plurality of thumbnail image bundles G1, G2, and G3 is enlarged and displayed according to the enlargement instruction. That is, when the enlargement instruction of the thumbnail image bundle G1 is received, the predetermined position P in the occupation rectangle D of the thumbnail image bundle G1 is set as a fixed point, and the control unit 3 enlarges the length in the vertical direction of each of the occupied rectangles D of the plurality of thumbnail image bundles G1, G2, and G3 and displays thereof on the image display unit 2.

Further, the predetermined position P as a fixed point may be any position as long as the position is along the vertical direction in the occupied rectangle D of the thumbnail image bundle G1 for which the enlargement instruction is received. For example, in a case where the enlargement instruction for the central thumbnail image bundle G2 is received, when the fixed point is the upper end of the thumbnail image bundle G2, the thumbnail image bundle G2 and the thumbnail image bundle G1 positioned above the thumbnail image bundle G2 can be enlarged and displayed simultaneously. When the fixed point is the lower end of the thumbnail image bundle G2, the thumbnail image bundle G2 and the thumbnail image bundle G3 positioned below the thumbnail image bundle G2 can be enlarged and displayed simultaneously. Note that the predetermined position P as a fixed point is specified by touching the occupied rectangle D of the thumbnail image bundles G1, G2, and G3, which will be instructed to enlarge, with a finger before a user issues an enlargement instruction.

According to this display method, when the plurality of thumbnail image bundles G1, G2, and G3 are displayed on the image display unit 2, the predetermined position P in the occupied rectangle D of the thumbnail image bundle G1, for which the enlargement instruction is received, is set as a fixed point, and the length in the vertical direction of each of the occupied rectangles D of the plurality of thumbnail image bundles G1, G2, and G3 is enlarged according to the enlargement instruction. Therefore, the thumbnail image bundle G2 adjacent to the thumbnail image bundle G1, for which the enlargement instruction is received, is also enlarged at the same time. Accordingly, the description content of the plurality of thumbnail images T constituting the thumbnail image bundle G2 adjacent to the thumbnail image bundle G1, for which the enlargement instruction is received, can be simultaneously checked.

Further, since the predetermined position P as a fixed point is positioned at any position of the vertical direction in the occupied rectangle D, it is possible to select which side of the thumbnail image bundle G1, G2, and G3 adjacent to the thumbnail image bundles G1, G2, and G3, for which the enlargement instruction is received in the vertical direction is to be enlarged and displayed simultaneously.

Hereinafter, the content derived from the above-described embodiment will be described.

The display method is a display method for displaying a plurality of images on a display unit in which the display unit displays an image bundle in which the plurality of images are arranged in a first direction, the image bundle has a static portion in which the images are arranged at equal intervals in a state where a part of the image is displayed by being overlapped with an adjacent image, and a dynamic portion in which an interval between the images adjacent to each other is arranged wider than an interval between the images in the static portion, the method including: enlarging a length of an occupied rectangle, in which the image bundle is occupied, in a second direction intersecting the first direction according to an enlargement instruction of the image bundle when receiving the enlargement instruction; and moving the image of the dynamic portion to the static portion to reduce the number of images of the dynamic portion, and enlarging a length in the first direction and the length in the second direction of the plurality of images at an enlargement ratio of the enlargement instruction when the enlargement ratio increases.

According to this display method, when the enlargement instruction of the image bundle is received, the entire image bundle is not enlarged as it is, but the length in the second direction of the occupied rectangle, in which the image bundle is occupied, is expanded according to the enlargement instruction. Therefore, in the images arranged in the dynamic portion, the length in the first direction and the length in the second direction of each image can be enlarged at an enlargement ratio, which is instructed to enlarge by reducing the number of images arranged in the dynamic portion according to the enlargement ratio without changing the length of the whole image bundle in the first direction, thereby, the description content of the plurality of images arranged in the dynamic portion can be checked simultaneously.

In the display method described above, the plurality of images may be arranged on a first virtual axis, and displayed by being rotated about each of second virtual axes intersecting the first virtual axis, and further rotated about the first virtual axis.

According to this display method, by configuring an image bundle in which the plurality of images, which are arranged on the first virtual axis, rotated about each second virtual axis that intersects the first virtual axis, and further rotated about the first virtual axis, are arranged in the first direction, it is possible to have a bird's-eye view of the description content of the plurality of images constituting the image bundle.

In the display method described above, the adjacent images arranged in the center of the dynamic portion in the first direction may be in contact with each other or an overlapping ratio of the adjacent images may become smaller when the number of the images in the dynamic portion decreases.

According to this display method, by displaying the adjacent images arranged in the dynamic portion so as to be in contact with each other or displaying so as to overlap at a predetermined rate, the description content of the thumbnail images T arranged in the dynamic portion can be easily checked.

In the display method described above, when the length of the display unit in the first direction is shorter than the length of the display unit in the second direction, the enlargement ratio may be set to a predetermined enlargement ratio.

According to this display method, in a case where the length of the display unit in the first direction is shorter than the length of the display unit in the second direction, the length of the occupied rectangle in the second direction can be greatly enlarged and displayed with respect to the length of the occupied rectangle in the first direction when trying to enlarge and display the image bundle in which the plurality of images are arranged in the first direction. Therefore, all the images arranged in the dynamic portion are moved to the static portion, a plurality of images constituting the image bundle are all arranged in the static portion, and then it becomes impossible to check the description content of the images arranged in the dynamic portion. Therefore, by setting a predetermined enlargement ratio, it is possible to display a predetermined number of images arranged in the dynamic portion, and it is easy to check the description content of the plurality of images arranged in the dynamic portion.

In the display method described above, the display unit may further display a plurality of the image bundles arranged in the second direction, set a predetermined position in the occupied rectangle of the image bundle for which the enlargement instruction is received as a fixed point, and enlarge the length of each of the occupied rectangles of the plurality of image bundles in the second direction according to the enlargement instruction.

According to this display method, when the plurality of image bundles are displayed on the display unit, the predetermined position in the occupied rectangle of the image bundle, for which the enlargement instruction is received, is set as a fixed point, and the length of each of the occupied rectangles of the plurality of image bundles in the second direction is enlarged according to the enlargement instruction. Therefore, the image bundle adjacent to the image bundle for which the enlargement instruction is received is also enlarged at the same time, so that the description content of the plurality of images constituting the image bundle adjacent to the image bundle for which the enlargement instruction is received can be checked simultaneously.

In the display method described above, the predetermined position may be positioned at any position in the occupied rectangle in the second direction.

According to this display method, since the predetermined position as the fixed point is positioned in the second direction in the occupied rectangle, it is possible to select which side of the image bundle adjacent to the image bundle, for which the enlargement instruction is received, in the second direction is to be enlarged and displayed simultaneously.

The display apparatus includes: a display unit that displays an image bundle consisting of a plurality of images; an image generation unit that generates the plurality of images in which each of the plurality of images arranged on a first virtual axis is rotated around each of the second virtual axes intersecting the first virtual axis, and further rotated around the first virtual axis; and a control unit that displays the image bundle having a static portion in which the images are arranged at equal intervals in a state where a part of the image is displayed by being overlapped with an adjacent image, and a dynamic portion in which an interval between the images adjacent to each other is arranged wider than an interval between the images in the static portion, enlarges a length of an occupied rectangle, in which the image bundle is occupied, in a second direction intersecting the first direction along the first virtual axis of the image bundle when receiving the enlargement instruction; and moves the image of the dynamic portion to the static portion to reduce the number of images of the dynamic portion, and enlarges and displays a length in the first direction and the length in the second direction of the plurality of images at an enlargement ratio of the enlargement instruction when the enlargement ratio increases.

According to this display apparatus, when the enlargement instruction of the image bundle is received, the entire image bundle is not enlarged, but the length of the occupied rectangle, in which the image bundle is occupied, in the second direction intersecting the first direction is enlarged according to the enlargement instruction. Therefore, regarding the images arranged in the dynamic portion, the length of the entire image bundle in the first direction can be made the same because the number of images arranged in the dynamic portion is reduced according to the enlargement ratio, and the description content of the plurality of images arranged in the dynamic portion can be checked simultaneously because an overlapping area between the adjacent images can be reduced.

What is claimed is:

1. A display method for displaying a plurality of images on a display in which
   the display displays an image bundle in which the plurality of images are arranged in a first direction,
   the image bundle has
     a static portion in which the images are arranged at equal intervals in a state where a part of the image is displayed by being overlapped with an adjacent image, and
     a dynamic portion in which an interval between the images adjacent to each other is arranged wider than an interval between the images in the static portion,
   the method comprising:
   enlarging a length of an occupied rectangle, in which the image bundle is occupied, in a second direction intersecting the first direction according to an enlargement instruction of the image bundle when receiving the enlargement instruction; and
   moving an image of the dynamic portion to the static portion to reduce the number of images of the dynamic portion, and enlarging a length in the first direction and a length in the second direction of the plurality of images at an enlargement ratio of the enlargement instruction when the enlargement ratio increases.

2. The display method according to claim 1, wherein the plurality of images are arranged on a first virtual axis, and displayed by being rotated about each of second virtual axes intersecting the first virtual axis, and further rotated about the first virtual axis.

3. The display method according to claim 1, wherein the adjacent images arranged in the center of the dynamic portion in the first direction are in contact with each other or an overlapping ratio of the adjacent images becomes smaller when the number of the images in the dynamic portion decreases.

4. The display method according to claim 1, wherein when a length of the display in the first direction is shorter than a length of the display in the second direction, the enlargement ratio is set to a predetermined enlargement ratio.

5. The display method according to claim 1, further comprising:
displaying a plurality of the image bundles arranged in the second direction by the display;
setting a predetermined position in the occupied rectangle of the image bundle for which the enlargement instruction is received as a fixed point; and
enlarging a length of each of the occupied rectangles of the plurality of image bundles in the second direction according to the enlargement instruction.

6. The display method according to claim 5, wherein the predetermined position is positioned at any position in the occupied rectangle in the second direction.

7. A display apparatus comprising:
a display that displays an image bundle consisting of a plurality of images;
an image generator that generates the plurality of images in which each of the plurality of images arranged on a first virtual axis are rotated about each of second virtual axes intersecting the first virtual axis, and further rotated about the first virtual axis; and
a controller that
displays the image bundle having
a static portion in which the images are arranged at equal intervals in a state where a part of the image is displayed by being overlapped with an adjacent image, and
a dynamic portion in which an interval between the images adjacent to each other is arranged wider than an interval between the images in the static portion,
enlarges a length of an occupied rectangle, in which the image bundle is occupied, in a second direction intersecting the first direction along the first virtual axis of the image bundle when receiving the enlargement instruction, and
moves an image of the dynamic portion to the static portion to reduce the number of images of the dynamic portion, and enlarges and displays a length in the first direction and a length in the second direction of the plurality of images at an enlargement ratio of the enlargement instruction when the enlargement ratio increases.

* * * * *